(12) United States Patent
Chen et al.

(10) Patent No.: US 11,974,259 B2
(45) Date of Patent: Apr. 30, 2024

(54) POSITIONING REFERENCE SIGNAL GENERATION METHOD AND APPARATUS, COMMUNICATION SYSTEM, AND STORAGE MEDIUM

(71) Applicant: ZTE CORPORATION, Guangdong (CN)

(72) Inventors: Shijun Chen, Guangdong (CN); Cheng Bi, Guangdong (CN); Dawei Chen, Guangdong (CN); Yuanyuan Wang, Guangdong (CN)

(73) Assignee: ZTE Corporation, Guangdong (CN)

( * ) Notice: Subject to any disclaimer, the term of this patent is extended or adjusted under 35 U.S.C. 154(b) by 619 days.

(21) Appl. No.: 17/264,424

(22) PCT Filed: Sep. 14, 2018

(86) PCT No.: PCT/CN2018/105683
§ 371 (c)(1),
(2) Date: Jan. 29, 2021

(87) PCT Pub. No.: WO2020/024381
PCT Pub. Date: Feb. 6, 2020

(65) Prior Publication Data
US 2021/0321402 A1  Oct. 14, 2021

(30) Foreign Application Priority Data

Jul. 30, 2018  (CN) .......................... 201810852229.6

(51) Int. Cl.
*H04L 5/00* (2006.01)
*H04W 64/00* (2009.01)
(Continued)

(52) U.S. Cl.
CPC ....... *H04W 72/0453* (2013.01); *H04L 5/0048* (2013.01); *H04W 64/00* (2013.01); *H04W 72/0446* (2013.01)

(58) Field of Classification Search
None
See application file for complete search history.

(56) References Cited

U.S. PATENT DOCUMENTS

2016/0134402 A1  5/2016 Park et al.
2017/0180095 A1  6/2017 Xue et al.
(Continued)

FOREIGN PATENT DOCUMENTS

CN  101156405 A  4/2008
CN  101594335 A  12/2009
(Continued)

OTHER PUBLICATIONS

International Search Report for the International Patent Application No. PCT/CN2018/105683, dated Mar. 27, 2019, 2 pages.
(Continued)

*Primary Examiner* — Jenkey Van
(74) *Attorney, Agent, or Firm* — KDW Firm PLLC (57) ABSTRACT

Provide are a positioning reference signal generation method and apparatus, a communication system and a storage medium. The method includes: generating a positioning frequency domain sequence according to time-frequency resource information and system configuration information, where the time-frequency resource information includes the number $N_{prs}^{slot}$ of allocated system symbols consecutive in time, and the system configuration information includes positioning subcarrier spacing $\Delta f^{prs}$; and generating, based on the positioning frequency domain sequence, positioning time domain data consecutive in a time period of the $N_{prs}^{slot}$ consecutive system symbols.

12 Claims, 3 Drawing Sheets

S401 Generate a positioning frequency domain sequence according to time-frequency resource information and system configuration information S402 Generate, based on the positioning frequency domain sequence, positioning time domain data consecutive in a time period of consecutive system symbols (51) Int. Cl.
*H04W 72/0446* (2023.01)
*H04W 72/0453* (2023.01)

(56) References Cited

U.S. PATENT DOCUMENTS

| | | | |
|---|---|---|---|
| 2017/0374640 A1 | 12/2017 | Kim et al. | |
| 2018/0007688 A1 | 1/2018 | Fu et al. | |
| 2018/0027481 A1 | 1/2018 | Xu et al. | |
| 2018/0097596 A1 | 4/2018 | Palanivelu et al. | |
| 2019/0253217 A1* | 8/2019 | Wu | H04L 9/40 |
| 2020/0154239 A1* | 5/2020 | Yamada | H04W 4/029 |
| 2020/0288456 A1* | 9/2020 | Matsumura | H04J 3/16 |
| 2021/0091905 A1* | 3/2021 | Si | H04W 72/04 |
| 2021/0126754 A1* | 4/2021 | Da | H04W 64/00 |
| 2021/0297215 A1* | 9/2021 | Da | H04W 72/0446 |

FOREIGN PATENT DOCUMENTS

| | | |
|---|---|---|
| CN | 102422663 A | 4/2012 |
| CN | 102474402 A | 5/2012 |
| CN | 102833849 B | 11/2014 |
| CN | 105162510 A | 12/2015 |
| CN | 106162922 A | 11/2016 |
| CN | 107079419 A | 8/2017 |
| CN | 107079464 A | 8/2017 |
| CN | 107113771 A | 8/2017 |
| CN | 107465497 A | 12/2017 |
| CN | 107889212 A | 4/2018 |
| CN | 108023699 A | 5/2018 |
| CN | 108023704 A | 5/2018 |
| CN | 108111279 A | 6/2018 |
| CN | 108260219 A | 7/2018 |
| WO | 2017162021 A1 | 9/2017 |
| WO | 2018064537 A1 | 4/2018 |

OTHER PUBLICATIONS

Office Action and Search Report for Chinese Application No. 201810852229.6, dated Aug. 18, 2021, original and translated documents, 21 pages.
3GPPTS 36.211 V15.2.0 (Jun. 2018) 3rd Generation Partnership Project; Technical Specification Group Radio Access Network; Evolved Universal Terrestrial Radio Access (E-UTRA); Physical channels and modulation (Release 15) 35 pages.
Indian Office Action for Application 202127008385, dated Jan. 26, 2022, 5 pages.
Intel—Motivation for SI: Study on NR Positioning a Technologies—3GPP TSG RAN Meeting #75—Dubrovnik, Croatia, Mar. 6-9, 2017, 11 pages.
ZTE., "Positioning PRS design in LTE R9" 3GPP TSG RAN WG1 #57—R1-091704—San Francisco, USA, May 4-8, 2009, 10 pages.
Ratasuk et al., "Enhancements of Narrowband IoT in 3GPP Rel-14 and Rel-15" 2017 IEEE Conference on Standards for Communication and Networking (CSCN), 6 pages.
Del Peral-Rosado et al., "Position Accuracy of Joint Time-Delay and Channel Estimators in LTE Networks" IEEE Access, vol. 6, 2018, 15 pages.
Second Chinese Office Action for the Chinese Patent Application No. 20180852229.6 dated Mar. 10, 2022, 11 pages.
Supplementary Search Report for the Chinese Patent Application No. 201810852229.6, dated Mar. 10, 2022, 4 pages.
European Search Report and Written Opinion for the European Patent Application No. 18928375, dated Mar. 25, 2022, 6 pages.

* cited by examiner

POSITIONING REFERENCE SIGNAL GENERATION METHOD AND APPARATUS, COMMUNICATION SYSTEM, AND STORAGE MEDIUM

CROSS-REFERENCE TO RELATED APPLICATIONS

This is a National Stage Application filed under 35 U.S.C. 371 based on International Patent Application No. PCT/CN2018/105683, filed on Sep. 14, 2018, which claims priority to Chinese Patent Application No. 201810852229.6 filed on Jul. 30, 2018, the disclosures of both of which are incorporated herein by reference in their entireties.

TECHNICAL FIELD

The present disclosure relates to, but is not limited to, the technical field of communications and, in particular, to a positioning reference signal (PRS) generation method and apparatus, a communication system and a storage medium.

BACKGROUND

Figure 1:
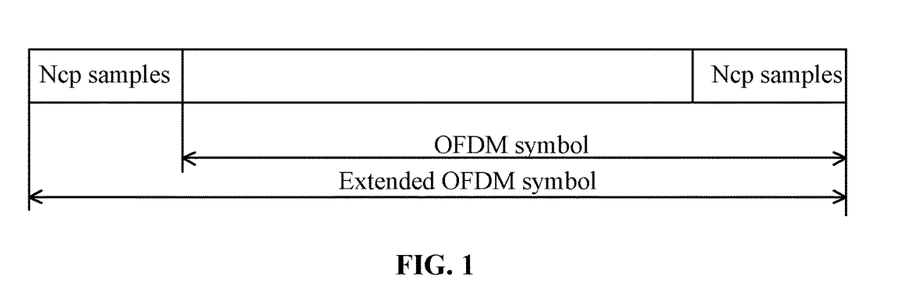
FIG. 1 is a structural diagram of a CP in the related art.
Figure 2:
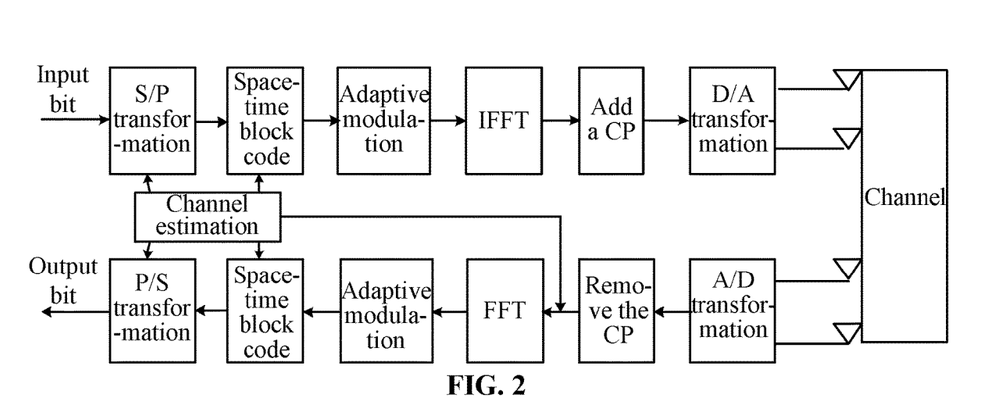
FIG. 2 is a flowchart of an OFDM transmitting system in the relate art.

Orthogonal frequency division multiplexing (OFDM) and an extension of the OFDM or a hybrid technology thereof are introduced in the long term evolution (LTE) technology and still used in the fifth generation mobile communication technology standard (5G). An advantage of such technologies is to reduce inter symbol interference (ISI) and inter-carrier interference (ICI) by setting a cyclic prefix (CP). The cyclic prefix is generated by copying the last part of each OFDM symbol and adding the last part into the front end of each OFDM symbol. In an OFDM system, a transmitting end performs an operation of adding a CP and a receiving end performs an operation of removing the CP. The structure of the CP is shown in FIG. 1. The flowchart of the receiving end and the transmitting end is shown in FIG. 2.

In the related art, the basic principle of an observed time difference of arrival (OTDOA) method is that: since different cells have different distances to a receiving node, the time $\tau_i$ taken for PRSs of different cells to arrive at the receiving node is different, an arrival time of a PRS of a neighboring cell and an arrival time of a PRS of a reference cell are subtracted to obtain an arrival time difference between the PRSs, and a distance difference between different cells is calculated according to the arrival time difference, thereby implementing the positioning of a terminal in a cell.

However, when the arrival time difference between PRSs of two cells exceeds the time length of one CP, PRSs on different symbols interfere with each other, thereby affecting a related detection on the receiving end side and affecting positioning results. Moreover, if the arrival time difference exceeds the time length of one CP, the positioning reference signal also interferes with communication data. This causes a limit where among all of K cells for measuring, the difference between the distance from the nearest cell to the receiving end and the distance from the farthest cell to the receiving end should not exceed the product of the time length of one CP and the speed of light.

Figure 3:
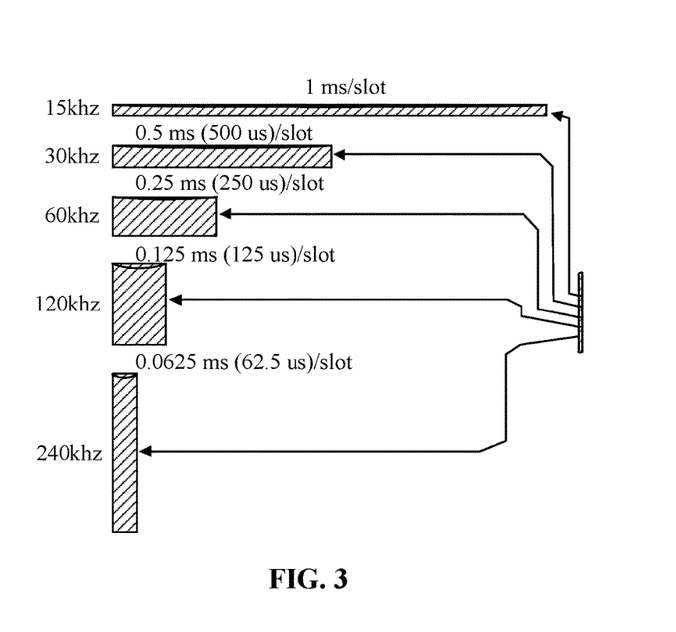
FIG. 3 is a schematic diagram of different subcarrier spacing in 5G according to an embodiment of the present disclosure.

However, a frame structure of the 5G has changed greatly compared with a frame structure of the LTE and supports a flexible configuration of subcarrier spacing. As shown in FIG. 3, the subcarrier spacing may be 30 kHz, 60 kHz, 120 kHz and 240 kHz. Corresponding to large subcarrier spacing, a system symbol has a small length, and the CP also has a small length, so that the OTDOA positioning cannot be effectively completed in a 5G scenario.

SUMMARY

In view of this, embodiments of the present disclosure provide a positioning reference signal generation method and apparatus, a communication system and a storage medium, so as to solve an issue that the OTDOA positioning cannot be effectively completed in a 5G scenario in the related art since a CP length becomes smaller as subcarrier spacing increases.

In a first aspect, an embodiment of the present disclosure provides a positioning reference signal generation method. The method includes the following steps: a positioning frequency domain sequence is generated according to time-frequency resource information and system configuration information, where the time-frequency resource information includes the number $N_{prs}^{slot}$ of allocated system symbols consecutive in time, and the system configuration information includes positioning subcarrier spacing $\Delta f^{prs}$; and positioning time domain data consecutive in a time period of the $N_{prs}^{slot}$ consecutive system symbols is generated based on the positioning frequency domain sequence.

In a second aspect, an embodiment of the present disclosure provides a positioning reference signal generation apparatus. The apparatus includes a first generation unit and a second generation unit. The first generation unit is configured to generate a positioning frequency domain sequence according to time-frequency resource information and system configuration information, where the time-frequency resource information includes the number $N_{prs}^{slot}$ of allocated system symbols consecutive in time, and the system configuration information includes positioning subcarrier spacing $\Delta f^{prs}$. The second generation unit is configured to generate, based on the positioning frequency domain sequence, positioning time domain data consecutive in a time period of the $N_{prs}^{slot}$ consecutive system symbols.

In a third aspect, an embodiment of the present disclosure provides a communication system. The communication system includes the positioning reference signal generation apparatus described in the embodiment of the present disclosure.

In a fourth aspect, an embodiment of the present disclosure provides a positioning reference signal generation apparatus. The positioning reference signal generation apparatus includes a memory, a processor, and a positioning reference signal generation program stored in the memory and executable by the processor. The positioning reference signal generation program, when executed by the processor, implements the positioning reference signal generation method provided by the embodiment of the present disclosure.

In a fifth aspect, an embodiment of the present disclosure provides a storage medium. The storage medium stores a computer program. The computer program, when executed by at least one processor, implements the positioning reference signal generation method provided by the embodiment of the present disclosure.

The embodiments of the present disclosure have the beneficial effects described below.

In the embodiments of the present disclosure, the positioning frequency domain sequence is generated according to the preset positioning subcarrier spacing, and the positioning time domain data consecutive in the time period of the $N_{prs}^{slot}$ consecutive system symbols is generated according to the positioning frequency domain sequence. That is, in the embodiments of the present disclosure, multiple system symbols are transformed to one positioning symbol, thereby effectively increasing a CP length, so that in the case where a system is configured with large subcarrier spacing and a short CP, the positioning reference signal is configured with small carrier spacing and a large CP length. Therefore, the coverage range of a positioning network is increased. In this way, the OTDOA positioning technology has greater feasibility, and the interference of the positioning reference signal to other signals is effectively avoided. Thereby, an issue that in the related art, the OTDOA positioning cannot be effectively completed in a 5G scenario since the CP length becomes smaller as the subcarrier spacing increases in the 5G is effectively solved.

The above description is only an overview of the technical scheme of the present disclosure. To better understand the technical means of the present disclosure, the present disclosure may be implemented according to the content of the description. Moreover, the specific implementation modes of the present disclosure are described below to make the above description and other objects, features and advantages of the present disclosure more clear and understandable.

DETAILED DESCRIPTION

Exemplary embodiments of the present disclosure will be described below in detail with reference to the drawings. The drawings illustrate the exemplary embodiments of the present disclosure, but it is to be understood that the present disclosure may be implemented in various ways and should not be limited to the embodiments set forth herein. On the contrary, these embodiments are provided for a thorough understanding of the present disclosure and to fully convey the scope of the present disclosure to those skilled in the art.

According to the embodiments of the present disclosure, in the case where a system is configured with large subcarrier spacing and a short CP, a positioning reference signal is configured with small subcarrier spacing and a large CP length, so as to increase the coverage range of a positioning network. The method of the present disclosure is explained and described in detail below.

Figure 4:
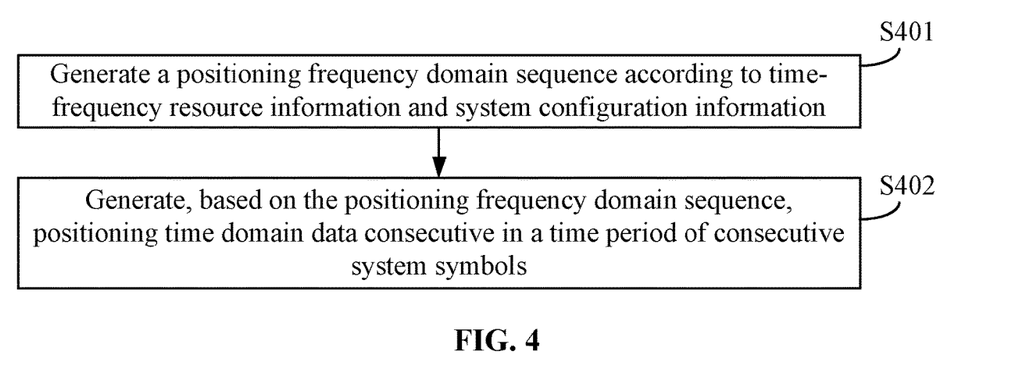
FIG. 4 is a flowchart of a positioning reference signal generation method according to an embodiment of the present disclosure.

An embodiment of the present disclosure provides a positioning reference signal generation method. Referring to FIG. 4, the method includes the steps described below.

In step S401, a positioning frequency domain sequence is generated according to time-frequency resource information and system configuration information.

The time-frequency resource information includes the number $N_{prs}^{slot}$ of allocated system symbols consecutive in time. The system configuration information includes positioning subcarrier spacing $\Delta f^{prs}$.

In this embodiment of the present disclosure, $\Delta f^{prs} \leq \Delta f^{sys}$ (which is system subcarrier spacing, or may be referred to as a system subcarrier spacing width; moreover, the positioning subcarrier spacing in this embodiment of the present disclosure may also be referred to as a positioning subcarrier spacing width), and $\Delta f^{sys} = \Delta f^{prs} * 2^{\lambda}$, where $\lambda$ is a natural number.

Moreover, in this embodiment of the present disclosure, the length of the positioning frequency domain sequence is equal to $2^{\lambda} *$the number of system subcarriers of an allocated frequency domain resource. In addition, the system subcarrier spacing $\Delta f^{sys}$ is equal to $2^{\lambda} *$the positioning subcarrier spacing $\Delta f^{prs}$, and the $N_{prs}^{slot}$ consecutive system symbols=$2^{\lambda}$.

In this embodiment of the present disclosure, the positioning frequency domain sequence is generated based on $\frac{1}{2}^{\lambda}$ multiplied by the system subcarrier spacing and according to the preset time-frequency resource information and a positioning base station identification (ID), thereby configuring the positioning reference signal with small subcarrier spacing.

In this embodiment of the present disclosure, $N_{prs}^{slot}$ is determined by resources occupied by various channels and reference signals and priorities thereof, and a feature of an allocation mode is to ensure that at least two consecutive system symbols of the $N_{prs}^{slot}$ consecutive system symbols are used for transmitting the PRS.

It is to be noted that in this embodiment of the present disclosure, the system symbols include symbols such as an OFDM symbol.

Figure 5:
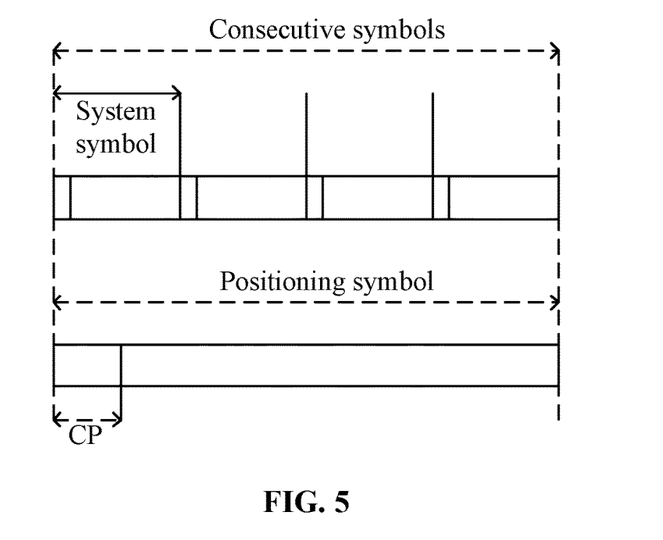
FIG. 5 is a schematic diagram of synthesizing multiple system symbols into one positioning reference signal according to an embodiment of the present disclosure.

FIG. 3 is a schematic diagram of different subcarrier spacing in 5G according to an embodiment of the present disclosure. It can be seen from FIG. 3 that the CP length becomes smaller as the system subcarrier spacing increases. FIG. 5 is a schematic diagram of synthesizing multiple system symbols into one positioning reference signal according to an embodiment of the present disclosure. As shown in FIG. 5, in this embodiment of the present disclosure, $2^2$ consecutive system symbols are configured as one positioning symbol in the present disclosure.

In step S402, positioning time domain data consecutive in a time period of the consecutive system symbols is generated based on the positioning frequency domain sequence.

Here, the number of consecutive system symbols is $N_{prs}^{slot}$.

That is, in this embodiment of the present disclosure, the positioning frequency domain sequence is generated according to the preset positioning subcarrier spacing, and the positioning time domain data consecutive in the time period of the $N_{prs}^{slot}$ consecutive system symbols is generated according to the positioning frequency domain sequence. That is, in this embodiment of the present disclosure, multiple system symbols are transformed to one positioning symbol, thereby effectively increasing the CP length, so that in the case where a system is configured with large subcarrier spacing and a short CP, the positioning reference signal is configured with small carrier spacing and a large CP length. Therefore, the coverage range of a positioning network is increased. In this way, the OTDOA positioning technology has greater feasibility, and the interference of the positioning reference signal to other signals is effectively avoided.

Thereby, an issue that in the related art, the OTDOA positioning cannot be effectively completed in a 5G scenario since the CP length becomes smaller as the subcarrier spacing increases in the 5G is effectively solved.

In this embodiment of the present disclosure, the method further includes the following step: the time-frequency resource information and the system configuration information are pre-allocated.

The time-frequency resource information further includes the number $N_{sys}^{subcarrier}$ of frequency domain system subcarriers, a serial number of each system subcarrier, and frequency domain resources consecutive in frequency domain and allocated within the $N_{prs}^{slot}$ system symbols having system subcarrier spacing. The system configuration information further includes a positioning base station ID and the system subcarrier spacing In implementation, in this embodiment of the present disclosure, the time-frequency resource information and the system configuration information are allocated by a positioning base station or by a communication system.

Moreover, during the allocation, system subcarriers and positioning subcarriers are configured according to $\Delta f^{sys} = \Delta f^{prs} * 2^\lambda$, so that the positioning frequency domain sequence having the preset $\Delta f^{prs}$ is generated in step S401, thereby implementing that the positioning reference signal is configured with small subcarrier spacing.

Table 1 shows different subcarrier spacing configurations in the 5G according to an embodiment of the present disclosure.

TABLE 1

| μ | Δf = 2^μ · 15 [kHz] | CP |
|---|---|---|
| 0 | 15 | Normal CP |
| 1 | 30 | Normal CP |
| 2 | 60 | Normal CP, Extended CP |
| 3 | 120 | Normal CP |
| 4 | 240 | Normal CP |

Table 2 shows CP configurations corresponding to different subcarrier bandwidths according to an embodiment of the present disclosure. As shown in Table 2, in this embodiment of the present disclosure, when the positioning subcarrier spacing is 15 kHz, the length of the corresponding system symbol is 66.67 us, the CP length is 4.69 us, and the total length of the positioning reference signal is 71.36 us.

TABLE 2

| Parameter/Numerlogy (u) | 0 | 1 | 2 | 3 | 4 |
|---|---|---|---|---|---|
| Positioning Subcarrier Spacing (kHz) | 15 | 30 | 60 | 120 | 240 |
| Length of a System Symbol (us) | 66.67 | 33.33 | 16.67 | 8.33 | 4.17 |
| CP Length (us) | 4.69 | 2.34 | 1.17 | 0.57 | 0.29 |
| Total Length of a Positioning Reference Signal (us) | 71.36 | 35.67 | 17.84 | 8.90 | 4.46 |

In this embodiment of the present disclosure, the step S401 includes the steps described below. It is determined that the length $N_{PRS}^{subcarrier}$ of the positioning frequency domain sequence=$N_{sys}^{subcarrier} * 2^\lambda$, where λ is a natural number. The positioning frequency domain sequence $\{X_k, k \in [0, N_{PRS}^{subcarrier}-1]\}$ with the length of $N_{PRS}^{subcarrier}$ and having the preset positioning subcarrier spacing is generated according to the serial number of each system subcarrier and the positioning base station ID, where λ and k are each a natural number.

In implementation, in this embodiment of the present disclosure, the positioning frequency domain sequence is generated according to a method specified in the 3rd Generation Partnership Project (3GPP) standards. Certainly, those skilled in the art may generate the positioning frequency domain sequence by other methods, which are not limited in the present disclosure.

In this embodiment of the present disclosure, the step S402 may include the following step: a Fourier transform is performed on the positioning frequency domain sequence to obtain positioning time domain data in the time period of the $N_{prs}^{slot}$ consecutive system symbols.

In this embodiment of the present disclosure, the Fourier transform is performed on the positioning frequency domain sequence, and a positioning time domain sequence $\{y^i, i \in [-cpsize^{prs}, FFTSIZE-1]\}$ consecutive in the time period of the $N_{prs}^{slot}$ consecutive system symbols that include a CP is obtained according to $Y(t) = \Sigma_{k=0}^{FFTSIZE-1} X_k e^{j\omega_k t}$. Here, $y^i = Y(i*T_s)$, j is a complex symbol, a baseband sampling period is $$T_s = \frac{1}{\Delta f^{prs} * FFTSIZE},$$

$cpsize^{prs}$ is equal to the time length of the CP, corresponding to $\Delta f^{prs}$, divided by $T_S$, FFTSIZE is the maximum number of subcarriers having subcarrier spacing of $\Delta f^{prs}$ within a preset bandwidth, FFTSIZE≥$N_{PRS}^{subcarrier}$, and the time period of the $N_{prs}^{slot}$ consecutive system symbols=(cpsize$^{prs}$+FFTSIZE)*$T_S$.

In this embodiment of the present disclosure, the time domain data in the time period of the $N_{prs}^{slot}$ consecutive system symbols is generated according to the positioning frequency domain sequence. That is, one positioning symbol is generated by multiple system symbols, as shown in FIG. 5.

In this embodiment of the present disclosure, multiple system symbols are transformed to one positioning symbol, thereby effectively increasing the CP length, so that in the case where a system is configured with large subcarrier spacing and a short CP, the positioning reference signal is configured with small carrier spacing and a large CP length. Therefore, the coverage range of a positioning network is increased. In this way, the OTDOA positioning technology has greater feasibility, and the interference of the positioning reference signal to other signals is effectively avoided. Thereby, an issue that in the related art, the OTDOA positioning cannot be effectively completed in a 5G scenario since the CP length becomes smaller as the subcarrier spacing increases in the 5G is effectively solved.

An embodiment of the present disclosure further provides a positioning reference signal generation method. In this embodiment of the present disclosure, the PRS generation method in 5G includes the steps described below.

In a first step, time-frequency resource information consecutive in time is allocated to a positioning reference signal, and system configuration information such as system subcarrier spacing, positioning subcarrier spacing and a PRSid (that is, a positioning base station identification) is determined.

The time-frequency resource information includes the number $N_{prs}^{slot}$ of allocated system symbols consecutive in time, the number $N_{sys}^{subcarrier}$ of frequency domain system subcarriers, and a serial number of each system subcarrier.

In this embodiment of the present disclosure, $N_{prs}^{slot}$ is determined by resources occupied by various channels and reference signals and priorities thereof, and a feature of an allocation mode is to ensure that at least two consecutive system symbols of the $N_{prs}^{slot}$ consecutive system symbols are used for transmitting the PRS.

The system configuration information includes the PRSid, the system subcarrier spacing, the positioning subcarrier spacing and the like. Configuration information of the system subcarrier spacing is as shown in FIG. 3. A configuration of the positioning subcarrier spacing is as shown in FIG. 5. The system subcarrier spacing and the positioning subcarrier spacing satisfy that: the system subcarrier spacing $\Delta f^{sys}>=$the positioning subcarrier bandwidth $\Delta f^{prs}$, and $\Delta f^{sys}=\Delta f^{prs}*2^{\lambda}$.

In a second step, a positioning frequency domain sequence to be transmitted is generated according to the configuration information of the positioning subcarrier spacing, the time-frequency resource information and PRSid information. The process includes the steps described below.

(1) The length of the positioning frequency domain sequence is determined as follows: the length $N_{PRS}^{subcarrier}$ of the positioning PRS sequence=$N_{sys}^{subcarrier}*2^{\lambda}$.

(2) The positioning frequency domain sequence with the length of $N_{PRS}^{subcarrier}$ and having the positioning subcarrier spacing is generated according to the PRSid and the time-frequency resource information.

In this embodiment of the present disclosure, the positioning frequency domain sequence generation method includes, but is not limited to, a method satisfying the specification in the 3GPP standards. The generated positioning frequency domain sequence is a positioning sub frequency domain sequence $\{X_k, k\in[0, N_{PRS}^{subcarrier}-1]\}$.

In a third step, positioning time domain data consecutive in the time period of $N_{prs}^{slot}$ consecutive system symbols is generated.

A Fourier transform is performed on the positioning frequency domain sequence. A positioning time domain sequence $\{y^i, i\in[-cpsize^{prs}, FFTSIZE-1]\}$ consecutive in the time period of the $N_{prs}^{slot}$ consecutive system symbols that includes a CP is obtained according to $Y(t)=\Sigma_{k=0}^{FFTSIZE-1}X_k e^{j\omega_k t}$. Here, $y^i=Y(i*Ts)$, j is a complex symbol, a baseband sampling period is $$T_s = \frac{1}{\Delta f^{prs}*FFTSIZE},$$

$cpsize^{prs}$ is equal to the time length of the CP, corresponding to $\Delta f^{prs}$, divided by $T_S$, FFTSIZE is the maximum number of subcarriers having subcarrier spacing of $\Delta f^{prs}$ within a preset bandwidth, FFTSIZE$\geq N_{PRS}^{subcarrier}$, and the time period of the $N_{prs}^{slot}$ consecutive system symbols=(cpsize$^{prs}$+FFTSIZE)*$T_S$.

In an embodiment, in this embodiment of the present disclosure, a value of the CP in a range is multiplied by $T_s$ to be used as a parameter t of Y (t), so as to obtain the CP of the time domain sequence. $T_s$ is the baseband sampling period:

$$T_s = \frac{1}{\Delta f^{prs}*FFTSIZE}.$$

The CP serves as the time domain data in the time period of the $N_{prs}^{slot}$ consecutive system symbols, and $CPsize^{prs}$ is equal to the CP length, corresponding to $\Delta f^{prs}$ in Table 1, divided by $T_S$.

According to the method described in this embodiment of the present disclosure, an issue that the CP is too short and limits the coverage range of a positioning base station is solved, so that in the case where a system is configured with large subcarrier spacing and a short CP, the positioning reference signal can be configured with small carrier spacing and a large CP length. Therefore, the coverage range of a positioning network is increased. In this way, the OTDOA positioning technology has greater feasibility, and the interference of the positioning reference signal to other signals is effectively avoided.

In an embodiment, in the case where a bandwidth is 100M, system subcarrier spacing is 240 kHz and positioning subcarrier spacing is 15 kHz, the generation of the positioning reference signal includes the steps described below.

(1) Time-frequency resource information and configuration information such as the system subcarrier spacing, the positioning subcarrier spacing and a PRSid are allocated to the positioning reference signal.

The number $N_{prs}^{slot}$ of consecutive system symbols, the number $N_{sys}^{subcarrier}$ of frequency domain system subcarriers and a serial number of each system subcarrier are allocated. The system bandwidth BW=100 MHz, $\Delta f^{sys}$=240 kHz, and $\Delta f^{prs}$=15 kHz.

(2) A positioning frequency domain sequence to be transmitted is generated according to the positioning subcarrier spacing, the time-frequency resource information and PRSid information.

The length of the positioning frequency domain sequence is determined as follows: the length $N_{PRS}^{subcarrier}$ of the positioning frequency domain sequence=$N_{sys}^{subcarrier}*2^{\lambda}$, where $\lambda$=4. The positioning frequency domain sequence is generated as follows: the positioning frequency domain sequence $\{X_k, k\in[0, N_{PRS}^{subcarrier}-1]\}$ is generated.

(3) Positioning time domain data consecutive in a time period of the $N_{prs}^{slot}$ consecutive system symbols is generated.

A Fourier transform is performed on the positioning frequency domain sequence. A positioning time domain sequence $\{y^i, i\in[-cpsize^{prs}, FFTSIZE-1]\}$ consecutive in the time period of the $N_{prs}^{slot}$ consecutive system symbols that include a CP is obtained according to $Y(t)=\Sigma_{k=0}^{FFTSIZE-1}X_k e^{j\omega_k t}$. Here, $y^i=Y(i*Ts)$, j is a complex symbol, a baseband sampling period is $$T_s = \frac{1}{\Delta f^{prs}*FFTSIZE},$$

$cpsize^{prs}$ is equal to the time length of the CP, corresponding to $\Delta f^{prs}$, divided by $T_S$, FFTSIZE is the maximum number of subcarriers having subcarrier spacing of $\Delta f^{prs}$ within a preset bandwidth, FFTSIZE≥$N_{PRS}^{subcarrier}$, and the time period of the $N_{prs}^{slot}$ consecutive system symbols=(cpsize$^{prs}$+FFTSIZE)*$T_S$.

The CP is the time domain data of the $N_{prs}^{slot}$ consecutive system symbols, and cpsize$^{prs}$ is equal to the CP length, corresponding to Δf$^{prs}$ in Table 1, divided by $T_S$.

In the case where a bandwidth is 100M, system subcarrier spacing is 120 kHz and positioning subcarrier spacing is 30 kHz, the generation of the positioning reference signal includes the steps described below.

(1) Time-frequency resource information and configuration information such as the system subcarrier spacing, the positioning subcarrier spacing and a PRSid are allocated to the positioning reference signal.

The number $N_{prs}^{slot}$ of consecutive system symbols, the number $N_{sys}^{subcarrier}$ of frequency domain system subcarriers and a serial number of each system subcarrier are allocated. The system bandwidth BW=100 MHz, Δf$^{sys}$=120 kHz, and Δf$^{prs}$=30 kHz.

(2) A PRS sequence to be transmitted is generated according to the positioning subcarrier spacing, the time-frequency resource information and PRSid information.

The length $N_{PRS}^{subcarrier}$ of the positioning frequency domain sequence=$N_{sys}^{subcarrier}$*$2^\lambda$, where λ=2.

The positioning frequency domain sequence is generated as follows: the positioning frequency domain sequence $\{X_k, k \in [0, N_{PRS}^{subcarrier}-1]\}$ is generated.

(3) Positioning time domain data consecutive in a time period of the $N_{prs}^{slot}$ consecutive system symbols is generated.

A Fourier transform is performed on the positioning frequency domain sequence. A positioning time domain sequence $\{y^i, i \in [-cpsize^{prs}, FFTSIZE-1]\}$ consecutive in the time period of the $N_{prs}^{slot}$ consecutive system symbols that include a CP is obtained according to $Y(t)=\Sigma_{k=0}^{FFTSIZE-1} X_k e^{j\omega_k t}$. Here, $y^i=Y(i*Ts)$, j is a complex symbol, a baseband sampling period is $$T_s = \frac{1}{\Delta f^{prs} * FFTSIZE},$$

cpsize$^{prs}$ is equal to the time length of the CP, corresponding to Δf$^{prs}$, divided by $T_S$, FFTSIZE is the maximum number of subcarriers having subcarrier spacing of Δf$^{prs}$ within a preset bandwidth, FFTSIZE≥$N_{PRS}^{subcarrier}$, and the time period of the $N_{prs}^{slot}$ consecutive system symbols=(cpsize$^{prs}$+FFTSIZE)*$T_S$.

The CP is the time domain data of the $N_{prs}^{slot}$ consecutive system symbols, and cpsize$^{prs}$ is equal to the CP length, corresponding to Δf$^{prs}$ in Table 1, divided by $T_S$.

Figure 6:
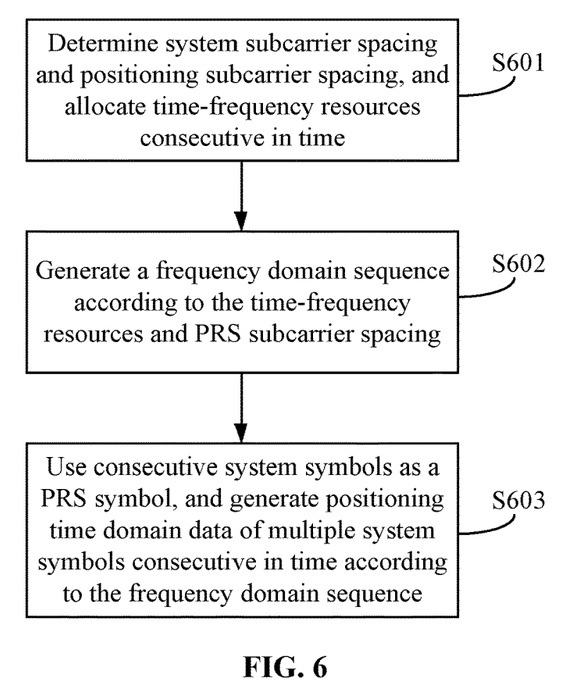
FIG. 6 is a flowchart of another positioning reference signal generation method according to an embodiment of the present disclosure.

FIG. 6 is a flowchart of another positioning reference signal generation method according to an embodiment of the present disclosure. In conjunction with FIG. 6, the positioning reference signal generation method in this embodiment of the present disclosure is explained and described in detail below.

In step S601, system subcarrier spacing and positioning subcarrier spacing are determined, and time-frequency resources consecutive in time are allocated.

That is, time-frequency resource information and system configuration information are allocated.

In step S602, a positioning frequency domain sequence is generated according to the time-frequency resources and the positioning subcarrier spacing.

In step S603, consecutive system symbols are transformed to one positioning symbol, and positioning time domain data of multiple system symbols consecutive in time is generated according to the positioning frequency domain sequence.

In this embodiment of the present disclosure, multiple system symbols are transformed to one positioning symbol, thereby effectively increasing a CP length, so that in the case where a system is configured with large subcarrier spacing and a short CP, the positioning reference signal is configured with small carrier spacing and a large CP length. Therefore, the coverage range of a positioning network is increased.

Figure 7:
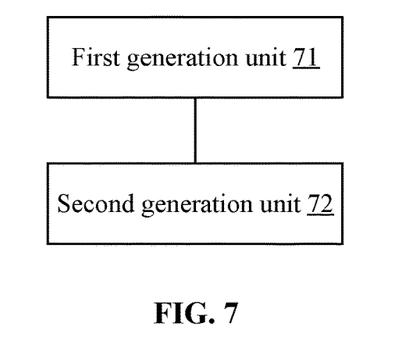
FIG. 7 is a structural diagram of a positioning reference signal generation apparatus according to an embodiment of the present disclosure.

An embodiment of the present disclosure provides a positioning reference signal generation apparatus. Referring to FIG. 7, the apparatus includes a first generation unit 71 and a second generation unit 72.

The first generation unit 71 is configured to generate a positioning frequency domain sequence according to time-frequency resource information and system configuration information. The time-frequency resource information includes the number $N_{prs}^{slot}$ of allocated system symbols consecutive in time. The system configuration information includes positioning subcarrier spacing Δf$^{prs}$.

The second generation unit 72 is configured to generate, based on the positioning frequency domain sequence, positioning time domain data consecutive in a time period of the $N_{prs}^{slot}$ consecutive system symbols.

That is, in this embodiment of the present disclosure, the first generation unit 71 generates the positioning frequency domain sequence according to the preset positioning subcarrier spacing, and the second generation unit 72 generates, according to the positioning frequency domain sequence, the positioning time domain data consecutive in the time period of the $N_{prs}^{slot}$ consecutive system symbols. That is, in this embodiment of the present disclosure, multiple system symbols are transformed to one positioning symbol, thereby effectively increasing a CP length, so that in the case where a system is configured with large subcarrier spacing and a short CP, the positioning reference signal is configured with small carrier spacing and a large CP length. Therefore, the coverage range of a positioning network is increased. In this way, the OTDOA positioning technology has greater feasibility, and the interference of the positioning reference signal to other signals is effectively avoided. Thereby, an issue that in the related art, the OTDOA positioning cannot be effectively completed in a 5G scenario since the CP length becomes smaller as the subcarrier spacing increases in the 5G is effectively solved.

In this embodiment of the present disclosure, the time-frequency resource information includes the number $N_{prs}^{slot}$ of $2^\lambda$ pre-allocated system symbols, the number $N_{sys}^{subcarrier}$ of frequency domain system subcarriers and a serial number of each system subcarrier, and the system configuration information includes a base station ID, system subcarrier spacing and positioning subcarrier spacing.

In implementation, in this embodiment of the present disclosure, the time-frequency resource information and the system configuration information are allocated by a base station which performs the positioning or by a communication system.

Moreover, during the allocation, system subcarriers and positioning subcarriers are configured according to Δf$^{sys}$=Δf$^{prs}$*$2^\lambda$, so that the first generation unit 71 can generate the positioning frequency domain sequence having the preset Δf$^{prs}$, thereby implementing that the positioning reference signal is configured with small subcarrier spacing.

Table 1 shows different subcarrier spacing configurations in the 5G according to an embodiment of the present disclosure.

TABLE 1

| μ | Δf = 2^μ · 15 [kHz] | CP |
|---|---|---|
| 0 | 15 | Normal CP |
| 1 | 30 | Normal CP |
| 2 | 60 | Normal CP, Extended CP |
| 3 | 120 | Normal CP |
| 4 | 240 | Normal CP |

Table 2 shows CP configurations corresponding to different subcarrier bandwidths according to an embodiment of the present disclosure. As shown in Table 2, in this embodiment of the present disclosure, when the positioning subcarrier spacing is 15 kHz, the length of the corresponding system symbol is 66.67 us, the CP length is 4.69 us, and the total length of the positioning reference signal is 71.36 us.

TABLE 2

| Parameter/Numerlogy (u) | 0 | 1 | 2 | 3 | 4 |
|---|---|---|---|---|---|
| Positioning Subcarrier Spacing (khz) | 15 | 30 | 60 | 120 | 240 |
| Length of a System Symbol (us) | 66.67 | 33.33 | 16.67 | 8.33 | 4.17 |
| CP Length (us) | 4.69 | 2.34 | 1.17 | 0.57 | 0.29 |
| Total Length of a Positioning Reference Signal (us) | 71.36 | 35.67 | 17.84 | 8.90 | 4.46 |

In a preferred embodiment of the present disclosure, the first generation unit 71 is further configured to determine that the length $N_{PRS}^{subcarrier}$ of the positioning frequency domain sequence=$N_{sys}^{subcarrier}*2^\lambda$, and generate, according to the serial number of each system subcarrier and a positioning base station ID, the positioning frequency domain sequence $\{X_k, k \in [0, N_{PRS}^{subcarrier}-1]\}$ with the length of $N_{PRS}^{subcarrier}$ and having the preset positioning subcarrier spacing.

In implementation, in this embodiment of the present disclosure, the first generation unit 71 generates the positioning frequency domain sequence according to a method specified in the 3GPP standards. Certainly, those skilled in the art may generate the positioning frequency domain sequence by other methods, which are not limited in the present disclosure.

In a preferred embodiment of the present disclosure, the second generation unit 72 is further configured to perform a Fourier transform on the positioning frequency domain sequence to obtain the positioning time domain data in the time period of the $N_{prs}^{slot}$ consecutive system symbols.

In an embodiment, the second generation unit in this embodiment of the present disclosure is further configured to perform a Fourier transform on the positioning frequency domain sequence, and obtain, according to $Y(t) = \Sigma_{k=0}^{FFTSIZE-1} X_k e^{j\omega_k t}$, a positioning time domain sequence $\{y^i, i \in [-cpsize^{prs}, FFTSIZE-1]\}$ consecutive in the time period of the $N_{prs}^{slot}$ consecutive system symbols that include a CP. Here, $y^i = Y(i*T_s)$, j is a complex symbol, a baseband sampling period is $$T_s = \frac{1}{\Delta f^{prs} * FFTSIZE},$$

$cpsize^{prs}$ is equal to the time length of the CP, corresponding to $\Delta f^{prs}$, divided by $T_s$, FFTSIZE is the maximum number of subcarriers having subcarrier spacing of $\Delta f^{prs}$ within a preset bandwidth, FFTSIZE≥$N_{PRS}^{subcarrier}$, and the time period of the $N_{prs}^{slot}$ consecutive system symbols=(cpsize$^{prs}$+FFTSIZE)*$T_S$.

In this embodiment of the present disclosure, the time domain data in the time period of the $N_{prs}^{slot}$ consecutive system symbols is generated according to the positioning frequency domain sequence. That is, one positioning symbol is generated by multiple system symbols, as shown in FIG. 5.

In this embodiment of the present disclosure, multiple system symbols are transformed to one positioning symbol, thereby effectively increasing the CP length, so that in the case where a system is configured with large subcarrier spacing and a short CP, the positioning reference signal is configured with small carrier spacing and a large CP length. Therefore, the coverage range of a positioning network is increased. In this way, the OTDOA positioning technology has greater feasibility, and the interference of the positioning reference signal to other signals is effectively avoided. Thereby, an issue that in the related art, the OTDOA positioning cannot be effectively completed in a 5G scenario since the CP length becomes smaller as the subcarrier spacing increases in the 5G is effectively solved.

A fourth embodiment of the present disclosure provides a communication system. The communication system includes the positioning reference signal generation apparatus described the embodiments of the present disclosure, which may be understood with reference to the embodiments of the present disclosure and is not discussed in detail here.

An embodiment of the present disclosure provides a storage medium. The storage medium stores a computer program. The computer program, when executed by a processor, implements the steps of the method described below.

A positioning frequency domain sequence is generated according to time-frequency resource information and system configuration information. The time-frequency resource information includes the number $N_{prs}^{slot}$ of allocated system symbols consecutive in time. The system configuration information includes positioning subcarrier spacing $\Delta f^{prs}$.

Positioning time domain data consecutive in a time period of the $N_{prs}^{slot}$ consecutive system symbols is generated based on the positioning frequency domain sequence.

In this embodiment, the storage medium includes, but is not limited to, a read-only memory (ROM), a random access memory (RAM), a magnetic disk, an optical disk or the like.

Figure 8:
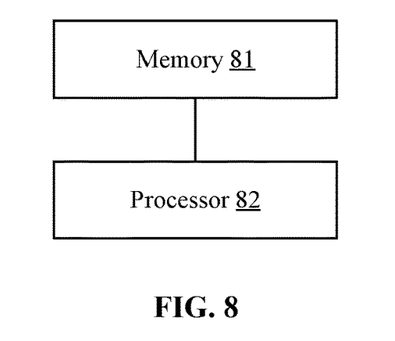
FIG. 8 is a structural diagram of a positioning reference signal generation apparatus according to an embodiment of the present disclosure.

An embodiment of the present disclosure provides a positioning reference signal generation apparatus. As shown in FIG. 8, the positioning reference signal generation apparatus includes a memory 81, a processor 82, and a positioning reference signal generation program stored in the memory 81 and executable by the processor 82. The positioning reference signal generation program, when executed by the processor 82, implements the steps of the method described below.

A positioning frequency domain sequence is generated according to time-frequency resource information and system configuration information. The time-frequency resource information includes the number $N_{prs}^{slot}$ of allocated system symbols consecutive in time. The system configuration information includes positioning subcarrier spacing $\Delta f^{prs}$.

Positioning time domain data consecutive in a time period of the $N_{prs}^{slot}$ consecutive system symbols is generated based on the positioning frequency domain sequence.

Apparently, it is to be understood by those skilled in the art that the various modules or steps of the present disclosure described above may be implemented by a general-purpose computing device, the modules or steps may be concentrated on a single computing device or distributed on a network composed of multiple computing devices. Optionally, the modules or steps may be implemented by program codes executable by the computing device, so that the modules or steps may be stored in a storage device and executed by the computing device. Moreover, in some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. A positioning reference signal (PRS) generation method, comprising:
   generating a positioning frequency domain sequence according to time-frequency resource information and system configuration information, wherein the time-frequency resource information comprises a number $N_{prs}^{slot}$ of allocated system symbols consecutive in time, and the system configuration information comprises positioning subcarrier spacing $\Delta f^{prs}$; and
   generating, based on the positioning frequency domain sequence, positioning time domain data consecutive in a time period of the $N_{prs}^{slot}$ consecutive system symbols;
   wherein a length of the positioning frequency domain sequence is equal to $2^\lambda *$a number of system subcarriers of an allocated frequency domain resource, wherein $\lambda$ is a natural number.

2. The method of claim 1, wherein
   the system configuration information further comprises a positioning base station identification (ID) and system subcarrier spacing; and
   the time-frequency resource information further comprises a number $N_{sys}^{subcarrier}$ of frequency domain system subcarriers, a serial number of each of the system subcarriers, and frequency domain resources consecutive in frequency domain and allocated within the $N_{prs}^{slot}$ system symbols having the system subcarrier spacing.

3. The method of claim 2, wherein
   the positioning subcarrier spacing $\Delta f^{prs}$ is equal to the system subcarrier spacing $\Delta f^{sys}*1/2^\lambda$; and
   the $N_{prs}^{slot}$ consecutive system symbols=$2^\lambda$, wherein $\lambda$ is a natural number.

4. The method of claim 3, wherein generating the positioning frequency domain sequence according to the time-frequency resource information and the system configuration information comprises:
   determining that a length $N_{PRS}^{subcarrier}$ of the positioning frequency domain sequence=$N_{sys}^{subcarrier}*2^\lambda$; and
   generating, according to the serial number of each of the system subcarriers and the positioning base station ID, the positioning frequency domain sequence $\{X_k, k \in [0,$ $N_{PRS}^{subcarrier}-1]\}$ with the length of $N_{PRS}^{subcarrier}$ and having the positioning subcarrier spacing, wherein k is a natural number.

5. The method of claim 4, wherein generating, based on the positioning frequency domain sequence, the positioning time domain data consecutive in the time period of the $N_{prs}^{slot}$ consecutive system symbols comprises:
   performing a Fourier transform on the positioning frequency domain sequence; and
   obtaining, according to $Y(t)=\Sigma_{k=0}^{FFTSIZE-1}X_x e^{j\omega_k t}$, a positioning time domain sequence $\{y_i, i \in [-cpsize^{prs}, FFTSIZE-1]\}$ consecutive in the time period of the $N_{prs}^{slot}$ consecutive system symbols that comprise a cyclic prefix (CP), wherein $y^i=Y(i*Ts)$, j is a complex symbol, a baseband sampling period is $$T_s = \frac{1}{\Delta f^{prs} * FFTSIZE},$$

$cpsize^{prs}$ is equal to a time length of the CP, corresponding to $\Delta f^{prs}$, divided by $T_S$, FFTSIZE is a maximum number of subcarriers having subcarrier spacing of $\Delta f^{prs}$ within a preset bandwidth, FFTSIZE$\geq N_{PRS}^{subcarrier}$, and the time period of the $N_{prs}^{slot}$ consecutive system symbols=$(cpsize^{prs}+$FFTSIZE$)*T_S$.

6. A non-transitory storage medium, storing a computer program, wherein the computer program, when executed by at least one processor, implements the positioning reference signal (PRS) generation method of claim 1.

7. A positioning reference signal (PRS) generation apparatus, comprising:
   a memory, which is configured to store a PRS generation program; and
   a processor, which is configured to execute the program, wherein the program, when executed, implements the PRS generation method of claim 1.

8. A positioning reference signal (PRS) generation apparatus, comprising:
   a processor; and a memory for storing instructions executable by the processor;
   wherein the processor is configured to:
   generate a positioning frequency domain sequence according to time-frequency resource information and system configuration information, wherein the time-frequency resource information comprises a number $N_{prs}^{slot}$ of allocated system symbols consecutive in time, and the system configuration information comprises positioning subcarrier spacing $\Delta f^{prs}$; and
   generate, based on the positioning frequency domain sequence, positioning time domain data consecutive in a time period of the $N_{prs}^{slot}$ consecutive system symbols;
   wherein a length of the positioning frequency domain sequence is equal to $2^\lambda *$a number of system subcarriers of an allocated frequency domain resource, wherein $\lambda$ is a natural number.

9. The apparatus of claim 8, wherein
   the system configuration information further comprises a positioning base station identification (ID) and system subcarrier spacing; and
   the time-frequency resource information further comprises a number $N_{sys}^{subcarrier}$ of frequency domain system subcarriers, a serial number of each of the system subcarriers, and frequency domain resources consecutive in frequency domain and allocated within the $N_{prs}^{slot}$ system symbols having the system subcarrier spacing.

10. The apparatus of claim 9, wherein
the processor is further configured to determine that a length $N_{PRS}^{subcarrier}$ of the positioning frequency domain sequence=$N_{sys}^{subcarrier}*2^{\lambda}$, wherein $\lambda$ is a natural number, and generate, according to the serial number of each of the system subcarriers and the positioning base station ID, the positioning frequency domain sequence $\{X_k, k\in[0, N_{PRS}^{subcarrier}-1]\}$ with the length of $N_{PRS}^{subcarrier}$ and having the positioning subcarrier spacing, wherein k is a natural number.

11. The apparatus of claim 10, wherein
the processor is further configured to perform a Fourier transform on the positioning frequency domain sequence; and obtain, according to $Y(t)=\Sigma_{k=0}^{FFTSIZE-1}X_k e^{j\omega_k t}$, a positioning time domain sequence $\{y^i, i\in[-cpsize^{prs}, FFTSIZE-1]\}$ consecutive in the time period of the $N_{prs}^{slot}$ consecutive system symbols that comprise a cyclic prefix (CP), wherein $y^i=Y(i*Ts)$, j is a complex symbol, a baseband sampling period is $$T_s = \frac{1}{\Delta f^{prs} * FFTSIZE},$$

$cpsize^{prs}$ is equal to a time length of the CP, corresponding to $\Delta f^{prs}$, divided by $T_S$, FFTSIZE is a maximum number of subcarriers having subcarrier spacing of $\Delta f^{prs}$ within a preset bandwidth, FFTSIZE≥$N_{PRS}^{subcarrier}$, and the time period of the $N_{prs}^{slot}$ consecutive system symbols=$(cpsize^{prs}+FFTSIZE)*T_S$.

12. A communication system, comprising the positioning reference signal (PRS) generation apparatus of claim 8.

* * * * *